US006201312B1

(12) United States Patent
Shioiri et al.

(10) Patent No.: US 6,201,312 B1
(45) Date of Patent: Mar. 13, 2001

(54) DRIVE CONTROL SYSTEM FOR HYBRID VEHICLES

(75) Inventors: Hiroyuki Shioiri, Susono; Hidehiro Oba, Aichi-ken; Hiroatsu Endo, Susono; Kazumi Hoshiya, Gotenba; Mitsuhiro Umeyama, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/234,376

(22) Filed: Jan. 21, 1999

(30) Foreign Application Priority Data

Feb. 17, 1998 (JP) .................................. 10-051516

(51) Int. Cl.⁷ ................................ F02N 11/06; H02P 9/04
(52) U.S. Cl. .................. 290/40 C; 290/40 A; 290/40 B; 290/40 D; 290/40 F; 290/46; 290/51
(58) Field of Search .................. 290/40 A–40 F

(56) References Cited

U.S. PATENT DOCUMENTS

| 5,327,992 | * | 7/1994 | Boll | 180/65 |
| 5,788,004 | * | 8/1998 | Friedmann et al. | 180/65.2 |
| 5,939,794 | * | 8/1999 | Sakai et al. | 290/40 A |
| 5,942,879 | * | 8/1999 | Ibaraki | 322/16 |
| 5,978,719 | * | 11/1999 | Yano et al. | 701/22 |
| 5,984,033 | * | 11/1999 | Tamagawa et al. | 180/65.2 |
| 6,007,443 | * | 12/1999 | Onimaru et al. | 475/5 |

FOREIGN PATENT DOCUMENTS 9-98516    4/1997  (JP) .

* cited by examiner

Primary Examiner—Elvin Enad
(74) Attorney, Agent, or Firm—Oliff & Berridge, PLC

(57) ABSTRACT

A control system for improving the fuel economy of a hybrid vehicle by evaluating a fuel to be consumed for a charging operation thereby to select a running mode. Specifically, a drive control system for a hybrid vehicle including an internal combustion engine, an electric motor and a battery device. The drive control system comprises: a first evaluator for evaluating the fuel consumption in the case assuming that the run with a demanded power is made by using the electric power reserved in the battery device, while including the fuel consumption at the time when the battery device is charged with the electric power; a second evaluator for evaluating the fuel consumption in the case assuming that the run with the demanded power is made by the motive power generated by burning the fuel in the internal combustion engine; and a motive power selector for selecting one of the run using the electric motor and the run using the internal combustion engine, on the basis of the evaluation results of the first evaluator and the second evaluator.

6 Claims, 9 Drawing Sheets

FIG.3
| RUNNING MODE | CLUTCH | |
| --- | --- | --- |
| | Ci | Cd |
| MOTOR RUNNING MODE | × | ○ |
| ENGINE RUNNING MODE | ○ | ○ |
| ASSIST MODE | ○ | × |
| NEUTRAL MODE | × | × |
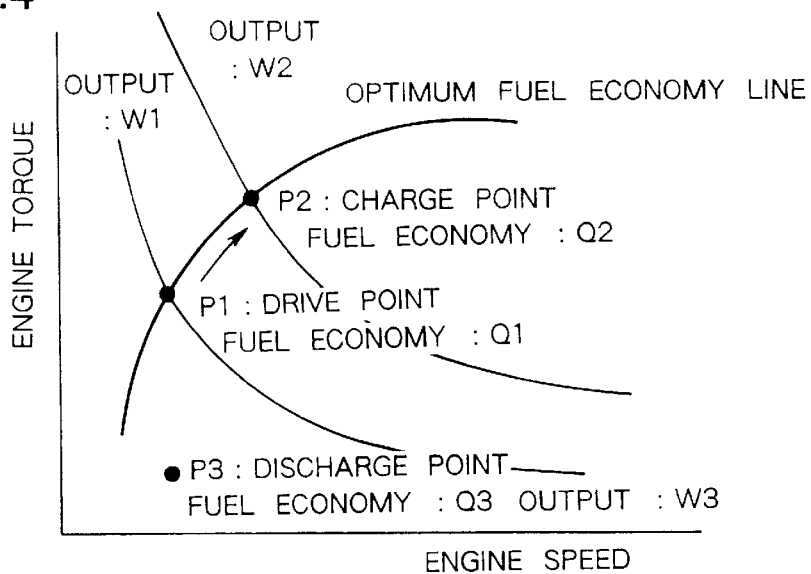
FIG.4
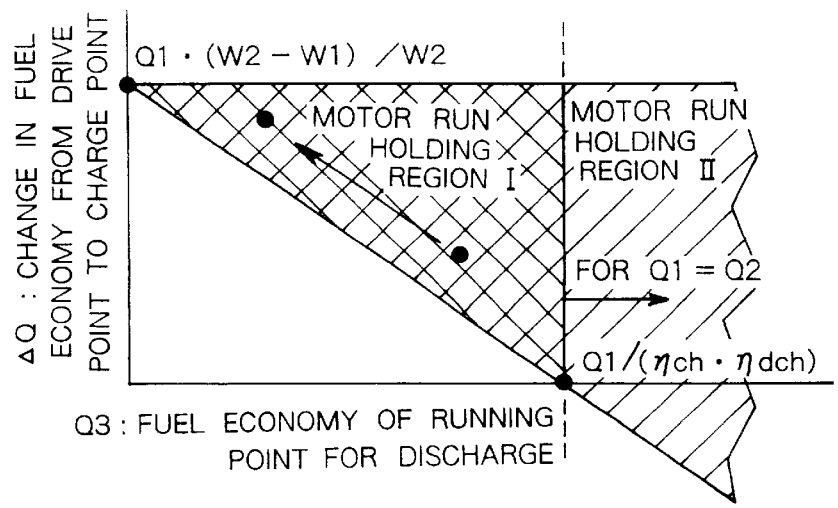
FIG.5

DRIVE CONTROL SYSTEM FOR HYBRID VEHICLES

BACKGROUND OF THE INVENTION

1. Field of the Invention

The present invention relates to a system for controlling a driving force in a hybrid vehicle which is provided as its prime mover with an internal combustion engine such as a gasoline engine or a Diesel engine and an electric motor such as a motor/generator for outputting a torque when energized by an electric power.

2. Related Art

The hybrid vehicle is a vehicle which has been developed with a view to improving the fuel economy and reducing the exhaust gasses, and has an internal combustion engine, an electric motor and a power generator mounted thereon. For a run, moreover, the hybrid vehicle is controlled to select a drive mode (or running mode) in which the fuel consumption is minimized.

Although the fuel is naturally consumed when the vehicle is run with the internal combustion engine, the electric power, as generated with the power generator by running the internal combustion engine, is consumed when the vehicle is run with the electric motor. After all, the fuel is indirectly consumed even if the vehicle is run with the electric motor. In other words, the effect of improving the fuel economy may differ depending upon the situations even when the vehicle is run with the electric motor.

When a high motive power is required at a low vehicle speed, the fuel consumption in the internal combustion engine increases to deteriorate both the fuel economy and the exhaust gasses. Similar situations are invited even while the vehicle is running, at the time of an acceleration when the degree of accelerator opening is large. Generally in the prior art, therefore, at a start or acceleration, the vehicle is run either with the electric motor or by adding the torque of the electric motor to the torque of the internal combustion engine. When the vehicle is run at a constant or higher speed, only the internal combustion engine is activated. Simultaneously with this, the electric power is generated at a low SOC (i.e., State Of Charge: charge state in a battery device) to charge the battery by the internal combustion engine.

In recent years, on the other hand, there has also been developed a system for selecting a drive source allowing the best fuel economy for generating a driving force demanded, in place of the aforementioned concept in which the running mode is changed depending exclusively upon the vehicle speed and the accelerator opening. This system is disclosed in Japanese Patent Laid-Open No. 9-98516 (JPA9-98516).

The disclosed system has contemplated to select a running mode for optimizing the fuel consumption, by considering the driving efficiency and the power generating efficiency, when the fuel consumption at the time of running the vehicle by generating the demanded driving force in the internal combustion engine and the fuel consumption necessary for the electric power generation are to be determined, and by considering an efficiency at the time of running the vehicle with the electric motor. When much regenerative energy is generated at a deceleration, moreover, the running region with the electric motor is widened.

The system disclosed in the Laid-Open is characterized in that the efficiency such as the driving efficiency or the charging efficiency is taken into consideration when either the internal combustion engine or the electric motor is to be selected as a drive sorce to minimize the fuel consumption for generating the demanded motive power. It can be incorporated into the control that those efficiencies are not necessarily constant but different according to the running state of the vehicle or the charged state of the battery device. This makes it possible to improve the fuel consumption and the exhaust gasses better.

Here, the efficiency such as the driving efficiency or the charging efficiency accompanying the change in the motive power source differs depending upon the state of the vehicle, as described in the above-specified Laid-Open. In the hybrid vehicle, in which the charging operation is performed while it is running, the fuel consumption necessary for the charge or the fuel consumption per unit of the electric power reserved already may be different. Specifically, there may be the charging cases consuming the higher and lower fuel consumption.

In the invention disclosed in the Laid-Open, the amount of fuel to be consumed for generating the demanded motive power and the amount of fuel to be consumed for achieving the electric power for generating the motive power are compared to select the running mode, i.e., the motive power source of the less fuel consumption. However, the disclosure has failed to consider how much fuel has been consumed for the reserved electric power. Specifically, the electric powers, as reserved by consuming the more and less fuels, are equivalently handled so that no consideration is taken into the so-called "unit price" of the reserved electric power (i.e., the fuel consumption per unit of the reserved electric power). This may admit use of an electric power of high unit price thereby to cause situations such as a reduction in the effect of improving the fuel economy.

SUMMARY OF THE INVENTION

A main object of the invention is to provide a drive control system for a hybrid vehicle, which is enabled to improve the fuel economy better in the entirety of the vehicle by evaluating the fuel economy of an already reserved electric power.

In order to achieve this object, the drive control system of the invention is constructed such that the fuel economy for the electric power reserved in the battery device is determined to compare the fuel economy for the run using the electric power and the fuel economy for the run using the internal combustion engine so that either the run by the electric motor or the run by the internal combustion engine may be selected on the basis of the comparison result of the two fuel economies.

According to the invention, more specifically, there is provided a drive control system for a hybrid vehicle, which can select a run using a motive power generated by burning a fuel in an internal combustion engine and a run using a motive power generated with an electric power by an electric motor and which can generate and reserve the electric power in a battery device, which system comprises: first evaluation means for evaluating the fuel consumption of the case assuming that the run with a demanded power is made by using the electric power reserved in the battery device, while including the fuel consumption at the time when the battery device is charged with the electric power; second evaluation means for evaluating the fuel consumption of the case assuming that the run with the demanded power is made by the motive power generated by burning the fuel in the internal combustion engine; and motive power selecting means for selecting one of the run using the electric motor and the run using the internal combustion engine, on the basis of the evaluation results of the first evaluation means and the second evaluation means.

Moreover, the drive control system of the invention may further comprise means for calculating the fuel consumption at the time when the battery device is charged with the electric power, on the basis of a difference between the fuel consumption of a running point of the internal combustion engine when the charging operation is performed, and the fuel consumption at a running point of the internal combustion engine when it is assumed that the charging operation is not performed.

In the invention, therefore, the energy to be consumed in the running case using the electric power is evaluated including the fuel amount actually consumed for generating the electric power, and the vehicle is run with the electric motor when the run by the electric power is more efficient in the fuel economy than the run by the internal combustion engine. As a result, not only the fuel economy of the case consuming the electric power but also the fuel economy of the running time using the electric motor including the fuel economy at the time of charging the electric power is evaluated. Thus, the comparison between the fuel economies between the run by the electric motor and the run by the internal combustion engine can be made accurate to improve the fuel economy better by selecting the motive power source on the basis of the evaluation result.

According to the invention, moreover, when the motive power of the internal combustion engine is employed for the charging operation, the fuel economy for the charging operation is calculated by adding the improvement in the fuel economy, as made by adding the load for the charge to the load on the internal combustion engine. In other words, the running point of the internal combustion engine is shifted to a higher efficiency side by adding the charging load to the running load. Since the fuel economy is evaluated considering the change in the efficiency, according to the invention, it is possible to improve the accuracy in the fuel economy evaluation at the charging time and the fuel economy of the entire vehicle.

The above and further objects and novel features of the invention will more fully appear from the following detailed description when the invention is read with reference to the accompanying drawings. It is to be expressly understood, however, that the drawings are for the purpose of illustration only and are not intended as a definition of the limits thereof.

BRIEF DESCRIPTION OF THE DRAWINGS

FIG. 3 is a table enumerating the running modes which can be set by the hybrid drive system;

FIG. 4 is a diagram illustrating a running point (or a drive point) at a running time and a running point (or a charge point) for charging in addition;

FIG. 5 is a diagram illustrating a motor running region which is set considering the difference in a fuel economy between the case of running and the case of charging in addition;

DETAILED DESCRIPTION OF THE PREFERRED EMBODIMENT

The invention will be described in more detail with reference to the accompanying drawings. The invention relates to a drive control system for a hybrid vehicle employing an electric motor and an internal combustion engine as its motive force sources. Here, the internal combustion engine is in short a motive force source for outputting a motive power by burning a fuel, as specified by a gasoline engine, a Diesel engine or a gas engine using a gaseous fuel such as a hydrogen gas and as classified into not only a reciprocating engine but also a turbine engine. Moreover, the internal combustion engine will be abbreviated into the "engine" in the following description.

On the other hand, the electric motor is in short a motive force source to be electrically activated to output a motive power, as specified by a variety of motors such as a stationary magnet type synchronous motor or a DC motor and further by a motor/generator to be driven by an external power to generate an electric power. Moreover, the electric motor can be used with a power generator. Here, the electric motor will be exemplified by the motor/generator.

The hybrid vehicle, to which the invention is applied, is of the type in which the engine is rotated by the output of the electric motor and started by feeding it with the fuel when its speed reaches a predetermined level. Specifically, the engine and the electric motor are coupled to a transmission mechanism so that the engine can be driven by the output torque of the electric motor, so that the output torques of these electric motor and engine can be synthesized and outputted by the transmission mechanism, and so that the output torque of the engine can be distributed to the electric motor and a transmission by the transmission mechanism. Thus, the transmission mechanism can be constructed of a planetary gear mechanism.

Figure 2:
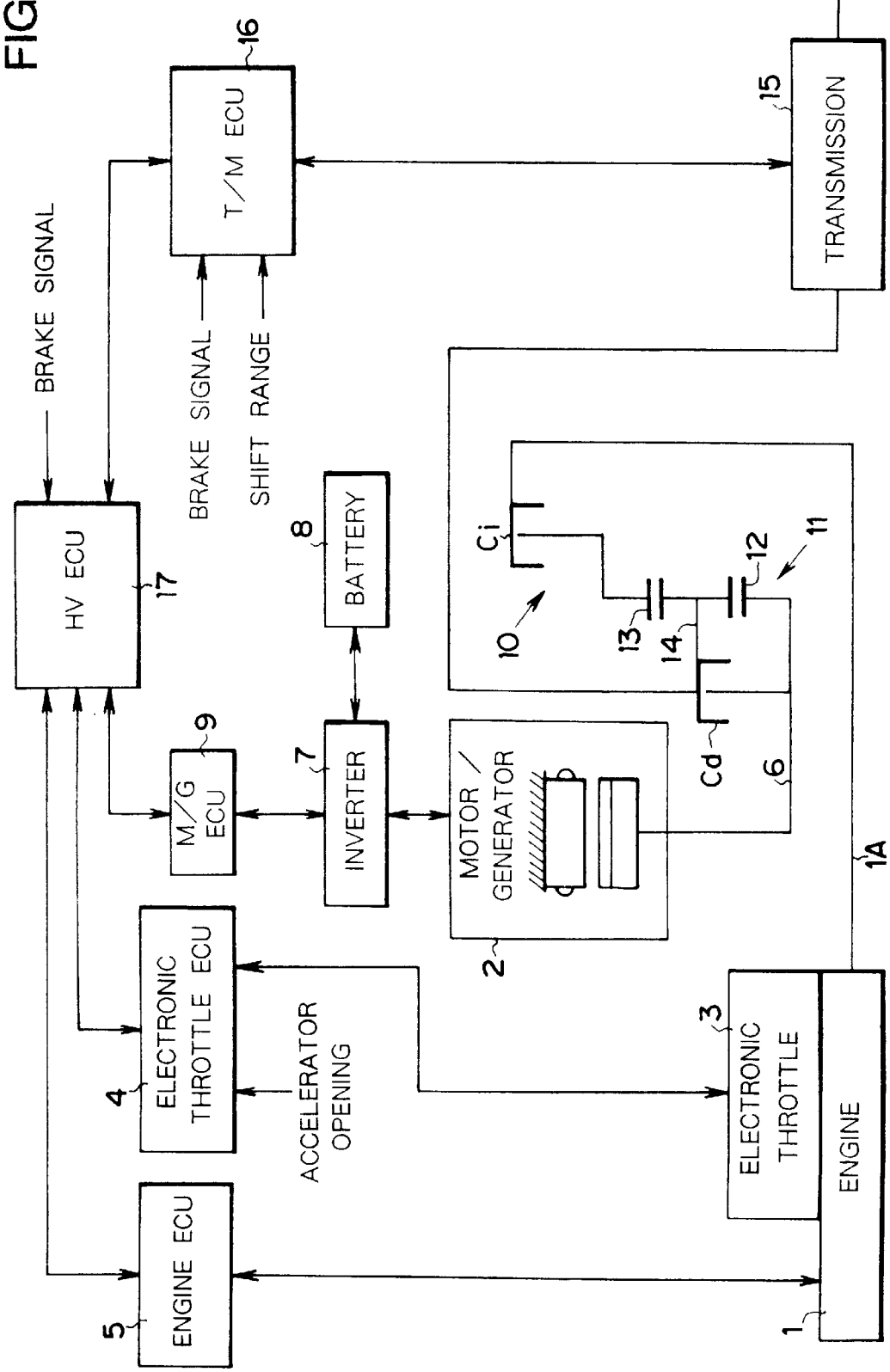
FIG. 2 is a block diagram schematically showing one example of a hybrid drive system to which the invention is applied.

FIG. 2 shows an entire construction of a drive control system in a hybrid vehicle according to the invention. This drive control system is equipped as a prime mover with an engine 1 and a motor/generator 2. The engine 1 is equipped with an electronic throttle valve 3 for increasing the degree of throttle opening in accordance with the depression of the not-shown accelerator pedal. There is provided an electronic throttle electronic control unit (or an electronic throttle ECU) 4 mainly for controlling the opening of the electronic throttle valve 3. This electronic control unit 4 is fed with an accelerator opening signal indicating the depression of the accelerator pedal, that is, the output demanded for the engine 1 (or the output demanded for the hybrid vehicle), to output a throttle opening signal, as based on the accelerator opening signal, to the electronic throttle valve 3. Here, the characteristic values for determining the relation between the accelerator opening and the throttle opening can be changed either according to the state of the vehicle or by the manual operation of the driver. There is further provided an engine electronic control unit (or an engine ECU) 5 for controlling the engine 1.

The motor/generator 2 is given a known construction in which an output torque is established at a rotary shaft 6 integrated with a rotor when the rotor is rotated by energizing a coil and in which an electromotive force is generated at the coil by rotating the rotor by an external force through the rotary shaft 6. A battery 8 is connected with the motor/generator 2 through an inverter 7. In order to control the rotation of the motor/generator 2, moreover, a motor/generator electronic control unit (M/G-ECU) 9 is connected with the inverter 7.

The engine 1 and the motor/generator 2 thus far described are coupled to a torque synthesizing/distributing mechanism 10. This torque synthesizing/distributing mechanism 10 is constructed mainly of a set of a single pinion type planetary gear mechanism 11 and two clutches Ci and Cd. A sun gear 12 or a first rotary element of the planetary gear mechanism 11 is mounted on the rotary shaft 6 of the motor/generator 2. An output member is provided either by a carrier 14 (corresponding to a third rotary element) holding a pinion gear which is arranged between the sun gear 12 and a ring gear 13 (corresponding to a second rotary element) or an internal gear arranged concentrically with that sun gear 12, or by a (not-shown) member such as a shaft integrated with that carrier 14.

The input clutch Ci is arranged between the ring gear 13 and an output shaft 1A of the engine 1 for coupling them selectively. Moreover, the integral clutch Cd integrates the entirety of the planetary gear mechanism 11 by coupling any two rotary elements (e.g., the sun gear 12 and the carrier 14) in the planetary gear mechanism 11. Here, these clutches Ci and Cd are made of friction clutches to be hydraulically applied.

The carrier 14 corresponds to the output member of the torque synthesizing/distributing mechanism 10 and is connected to a transmission 15. This transmission 15 is an automatic one capable of controlling the gear ratio electrically and is provided with a transmission electronic control unit (T/M-ECU) 16. This electronic control unit 16 is fed with signals such as a brake signal or a shift range signal indicating the state of the vehicle.

The individual electronic control units 4, 5, 9 and 16 thus far described are connected for data communications with a hybrid electronic control unit 17. This hybrid electronic control unit 17 is fed with signals such as the brake signal indicating the state of the vehicle and communicates to transmit data with the other electronic control units 4, 5, 9 and 16.

FIG. 3 tabulates the running modes which can be set by the drive system shown in FIG. 2. In FIG. 3, symbols ◯ denote the applied state, and symbols X denote the released state. Here will be briefly described the individual running modes. Of these, the motor running mode is one in which the vehicle is run exclusively by the output of the motor/generator 2. In this motor running mode, the input clutch Ci is released or partially applied, or temporarily applied, and the integral clutch Cd is applied. As a result, the planetary gear mechanism 11 is integrated in its entirety so that the motor/generator 2 is directly coupled to the transmission 15 to input the motor torque to the transmission 15.

The engine running mode is one in which the vehicle is run by the output of the engine 1 and in which the electric power is generated, if necessary. In this mode, both the input clutch Ci and the integral clutch Cd are applied to couple the engine 1 to the ring gear 13 and to integrate the planetary gear mechanism 11 as a whole. As a result, the output torque of the engine 1 is transmitted to the integrated planetary gear mechanism 11 and further to the transmission 15. Since the motor/generator 2 is coupled to the integrated planetary gear mechanism 11, on the other hand, the motor/generator 2 can be rotated by the engine 1 to generate the electric power. Since the output torque of the motor/generator 2 can be transmitted from the planetary gear mechanism 11 to the transmission 15, moreover, the output torque of the engine 1 and the output torque of the motor/generator 2 can be synthesized and outputted.

Here will be described an assist mode. Since the aforementioned torque synthesizing/distributing mechanism 10 is constructed of the planetary gear mechanism 11, the output torque can be changed in various ways by the differential action of the planetary gear mechanism 11. In this assist mode, therefore, for the differential action of the planetary gear mechanism 11, the integral clutch Cd is released whereas the input clutch Ci is applied, so that the engine 1 is coupled to the ring gear 13. In this case: the carrier 14 coupled to the transmission 15 acts as an output element; the ring gear 13 acts as an input element; and the sun gear 12 acts as a reaction element.

In this state, the output torque of the engine 1 is transmitted to the ring gear 13, and the motor/generator 2 and the sun gear 12 are rotated backward. Then, the carrier 14 is stopped or rotated at a lower speed than that of the ring gear 13. If the motor/generator 2 is rotated backward to bring the carrier 14 into a stopped state, more specifically, the vehicle can be kept in the stopped state. If the backward speed of the motor/generator 2 and the sun gear 12 connected to the former is gradually reduced, moreover, the carrier 14 rotates in the same direction as that of the engine 1, and its speed gradually rises. Therefore, the torque to be established at the carrier 14 is either the sum of the output torque of the engine 1 and the reaction torque of the motor/generator 2 or the torque which is augmented according to the gear ratio in the planetary gear mechanism 11. This results in that the engine torque is augmented by the motor torque.

Moreover, a neutral mode is one in which no torque is inputted to the transmission 15. In this neutral mode, both the input clutch Ci and the integral clutch Cd are released. In the planetary gear mechanism 11, therefore, the ring gear 13 rotates idly to relieve the torque, so that the output torque of the engine 1 or the motor/generator 2 will not be inputted to the transmission 15 even if it rotates. This establishes the neutral state in which no driving torque is generated.

Figure 1:
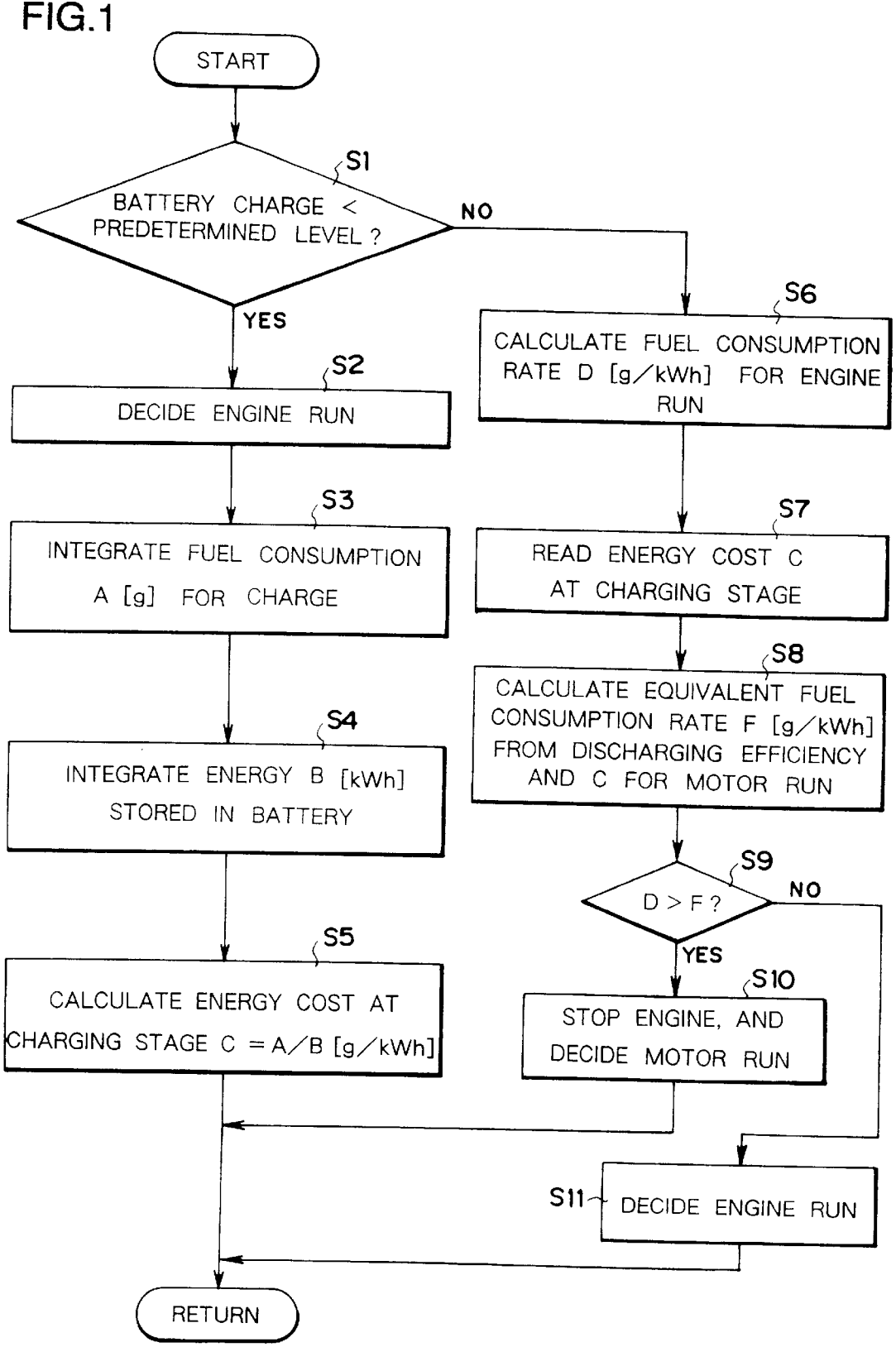
FIG. 1 is a flow chart for explaining a control example according to the invention.

The hybrid vehicle has been developed to have a basic object to improve the fuel economy and reduce the exhaust gasses so that the aforementioned individual running modes are selected according to the intrinsic object of the vehicle. Moreover, the control system according to the invention selects the motor running mode and the engine running mode by evaluating the consumed fuel at the time when the battery 8 corresponding to a storage device of the invention is charged. FIG. 1 is a flow chart showing one example of the control routine for selecting those running modes.

First of all, it is decided whether or not there is any room for selecting the motor running mode to run the vehicle by the motor/generator 2. Specifically, it is decided (at Step S1) whether or not the battery charge is lower than a predetermined level. When the motor run cannot be made due to the shortage of the battery charge, the answer of Step S1 is YES.

In this case, the engine running mode is decided (at Step S2). Specifically, both the aforementioned input clutch Ci and integral clutch Cd are applied to bring the engine 1 into the so-called "directly coupled state" in which the engine 1 is directly coupled to the motor/generator 2 and the transmission 15. By the output of the engine 1, therefore, the vehicle is run, and the motor/generator 2 is driven to generate the electric power and to charge the battery 8. In the hybrid vehicle, as described hereinbefore, the engine 1 can be driven even in a vehicle stop state thereby to charge the battery 8.

When the engine running mode is thus selected so that the charging operation is performed by the output of the engine 1, the electric power is evaluated. Specifically, the fuel consumption A for the charge is integrated (at Step S3), and simultaneously with this, the electric power B (or electric energy) reserved in the battery 8 is integrated (at Step S4). Then, the energy cost C at the charging stage is calculated (at Step S5) on the basis of those fuel consumption A and electric power B. In short, the fuel consumption C per unit of the electric power, as charged in this engine running mode, is operated.

Here, the engine running mode includes the so-called "power mode", in which the vehicle is driven by running the engine 1, and the regeneration mode in which the electric power is generated during a deceleration by the inertial energy, and the aforementioned electric power B includes one charged in the power mode and the other charged in the regeneration mode. When the power generation time by the regeneration is long, therefore, there are lowered the fuel consumption A and the energy cost C for the charge. Moreover, the driving efficiency fluctuates depending upon the driving state of the engine 1 and the control state of the transmission 15, and the charge efficiency fluctuates depending upon the existing charge of the battery 8, so that the fuel consumption at the charging time in the engine running mode changes depending upon the state of a running road, the driving characteristics of each driver and the continuous time for charge. The fuel consumption A and the electric power B thus far described are preferably integrated to values considering those driving efficiency and charge efficiency.

When the motor run can be made because the charge in the battery 8 exceeds the predetermined level, on the contrary, the answer of Step S1 is No. Then, the vehicle can be run by the motor so that a comparison is made to select the running modes between the results of evaluation of the fuel consumption in the engine running mode and the fuel consumption in the motor running mode.

First of all, the fuel consumption is evaluated on the assumption that the engine run is made in the prevailing states of the vehicle and the running road. Specifically, a fuel consumption rate D is calculated (at Step S6). What is calculated is the amount of fuel necessary for outputting a unit energy (e.g., 1 KWh). In order to evaluate the fuel consumption in the motor running mode, on the other hand, the energy cost C, as determined at Step S5, is read (at Step S7). On the basis of the discharge efficiency and the energy cost C in the case of running with the electric power, there is calculated (at Step S8) an equivalent fuel consumption rate F of the electric power to be consumed with the assumption of the motor run. Specifically, a product of the energy cost C and the discharge efficiency is determined.

Then, a comparison is made (at Step S9) between the fuel consumption rate D assuming the engine run and the equivalent fuel consumption rate F assuming the motor run. Specifically, it is decided whether or not the former fuel consumption rate D is higher than the latter equivalent fuel consumption rate F. When the answer of this Step S9 is YES, the engine running mode consumes more fuel than the motor running mode. Therefore, the engine 1 is stopped, and the motor run is decided (at Step S10). When the answer of Step S9 is NO, on the contrary, the motor running mode consumes more fuel than the engine running mode so that the engine run is decided (at Step S11).

In the control shown in FIG. 1, therefore, the running mode at a lower fuel consumption rate is selected. In this case, not only the fuel consumption rate in the engine running mode and the fuel consumption rate in the motor running mode are not merely compared, but also the energy cost of the electric power to be employed for the motor run is incorporated into the evaluation of the fuel consumption rate in the motor running mode. Therefore, the calculation of the fuel consumption rate in the motor running mode can be made accurate so that the selection in the running mode on the basis of the fuel economy can be made accurate to improve the fuel economy.

Here, the fuel consumption rate (or fuel economy) in the case where the engine 1 is run is improved as the engine load rises. If, therefore, the fuel consumption for charging the battery by driving the engine 1 is determined considering the difference between the fuel economies with and without the charge, the selection of the running mode based on the fuel economy can be made more accurate. This will be described more specifically. FIG. 4 is a diagram illustrating the engine rinning point at the charging/discharging time. Lines of outputs W1 and W2 are equi-output lines for the individual outputs, and curves intersecting these equi-output lines indicate the optimum fuel economy lines. The run of the engine 1 is effected in the state which is indicated by the intersections between the equi-output lines and the optimum fuel economy lines. If it is assumed that the engine 1 is run with the output W1, the intersection between the equi-output line and the optimum fuel economy line presents a running point P1. When the charge is to be performed from this state, the output of the engine 1 is augmented to shift the running point to a point P2. In other words, the intersection between the equi-output line of the output W2 and the optimum fuel economy line provides the running point P2 for the charging operation. The fuel amount Fc necessary for the power generation at unit time (e.g., 1 second) is expressed by the following Formula:

$$Fc = W2 \cdot Q2 - W1 \cdot Q1.$$

Here, Q1 designates the fuel economy (i.e., the fuel consumption per unit energy) at the running point P1, and Q2 designates the fuel economy at the running point P2.

Moreover, a net energy Ec, as generated for a unit time, is expressed by the following Formula:

$$Ec = (W1 - W2) \cdot \eta ch \cdot \eta dch.$$

Here, $\eta ch$ designates an energy conversion factor at the charging time, and $\eta dch$ designates an energy conversion factor at the discharging time.

The fuel amount Fs, which need not be consumed when the vehicle is run by the electric power charged under the aforementioned conditions and at an engine running point (of an output W3 and a fuel economy Q3) indicated by P3 in FIG. 4, is expressed by the following Formula:

$$Fs = W3 \cdot Q3 \cdot t \text{ (for a charge of 1 second and discharge of t seconds)}.$$

From the balance of the charging and discharging energies, $$W3 \cdot t = (W2 - W1) \cdot \eta ch \cdot dch,$$

the following Equation holds:

$$Fs = W3 \cdot Q3 \cdot t = (W2 - W1) \cdot Q3 \cdot \eta ch \cdot dch.$$

Moreover, the conditions for the motor run to hold are that fuel amount not to be consumed for the motor run is more than that to be consumed for charging the electric power, that is, Fs>Fc (>0). After all, the motor run holding conditions are expressed by the following relations:

$$(W2-W1) \cdot Q3 \cdot \eta ch \cdot \eta dch > W2 \cdot Q2 - W1 \cdot Q1 > 0.$$

These relations are expressed by using the difference of $\Delta Q$ (=Q1−Q2) between the fuel economy Q1 for only the run by driving the engine 1 and the fuel economy Q2 for not only the run but also the charge, as follows:

$$(W2-W1) \cdot \eta ch \cdot \eta dch > W2 \cdot (Q1-\Delta Q) - W1 \cdot Q1 > 0.$$

These relations are illustrated in FIG. 5 by taking the fuel economy Q3 (representing the discharge point characteristics) on the abscissa and the difference $\Delta Q$ (representing the charge point characteristics) on the ordinate.

In the absence of any special consideration into the fuel economy at each engine running point, Q1=Q2, and the motor run is performed only in a range on the right side of the point of Q3=Q1/ηch·ηdch in FIG. 5. If the motor run holding conditions are determined by additionally considering the fuel economy at each engine running point, however, the motor run is performed in the cross-hatched region of FIG. 5, too. In other words, the engine run is effected in the prior art in the cross-hatched region of FIG. 5 so that more fuel is consumed than for the motor run to improve the fuel economy insufficiently. However, this fuel economy can be improved far better than the prior art by considering the changes in the engine running point and in the fuel economy, as accompanying the charging operation.

Figure 6:
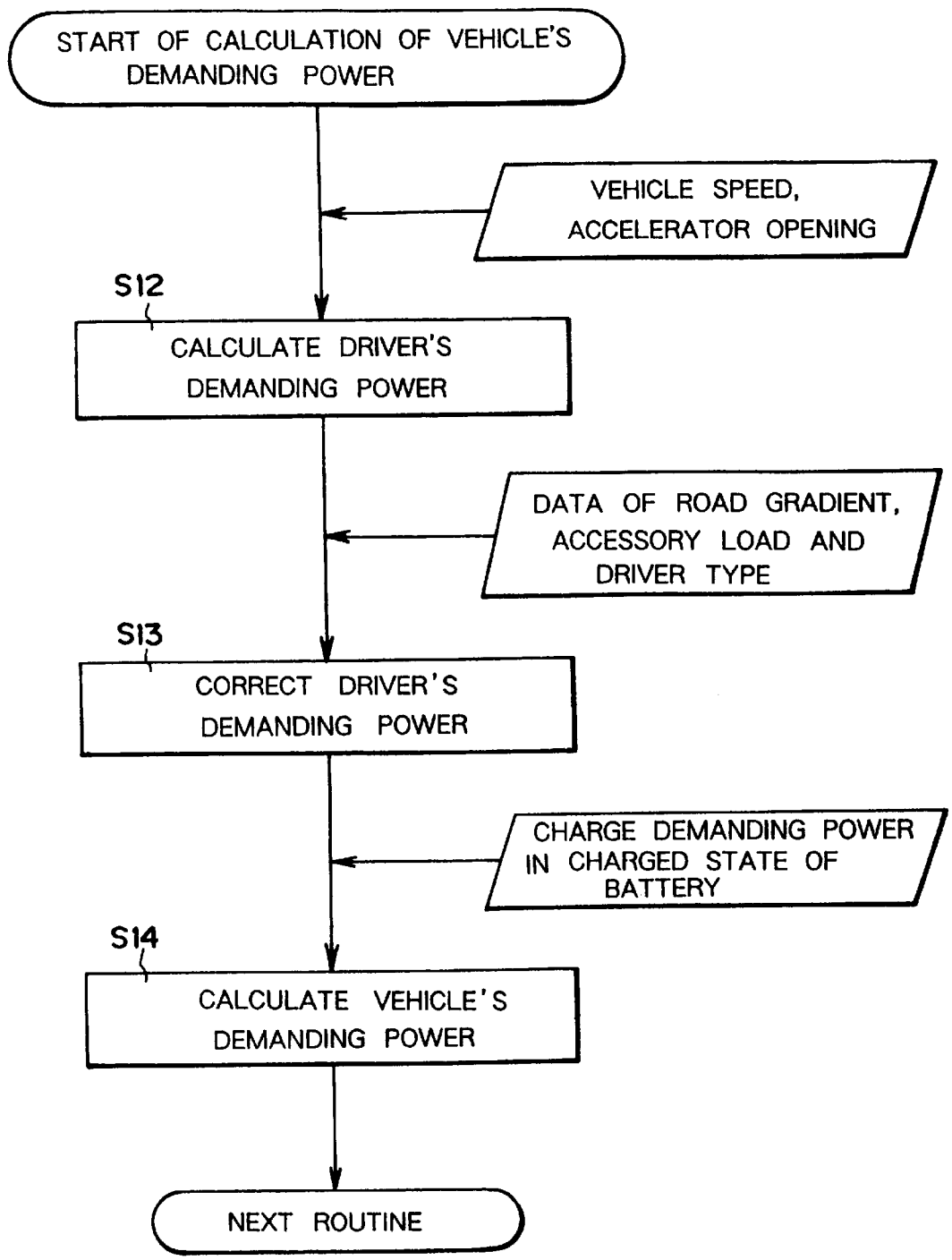
FIG. 6 is a flow chart showing one example of a routine for calculating a vehicle's demanding power.
Figure 7:
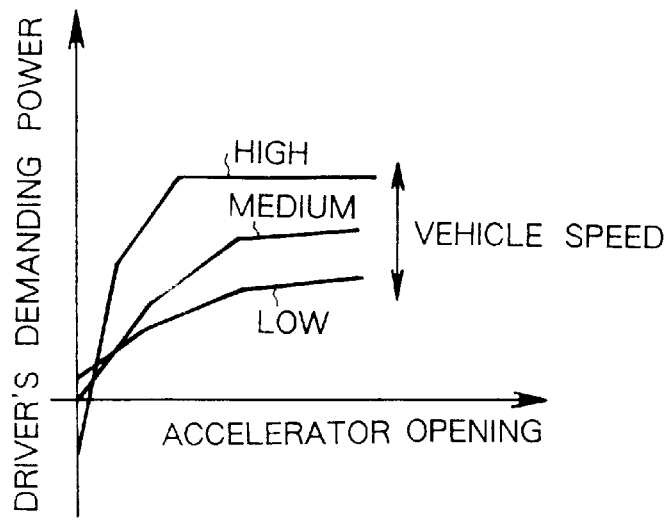
FIG. 7 is a diagram illustrating one example of a fundamental map for determining a power demanded by a driver.

Here will be described the calculations of the output demanded by the vehicle (i.e., the vehicle's demanding power) in the engine running mode, in the motor running mode and in the assist mode. The motive power source for the engine 1 or the motor/generator 2 is demanded to act not only as a motive power for running or accelerating the vehicle but also as a motive power for activating the individual portions of the vehicle such as illuminators or an air conditioner. As shown in FIG. 6, therefore, the driver's demanding power is calculated (at Step S12) by reading data such as the vehicle speed or the accelerator opening. FIG. 7 illustrates one example of the map for calculating the driver's demanding power on the basis of the vehicle speed and the accelerator opening. The higher driver's demanding power is decided for the higher vehicle speed and the larger accelerator opening. Here, a plurality of maps of this kind may be provided according to the driving taste of the driver so that a map matching the driver's taste may be selected by a switching operation or by a decision of a device using a neural net.

Figure 8:
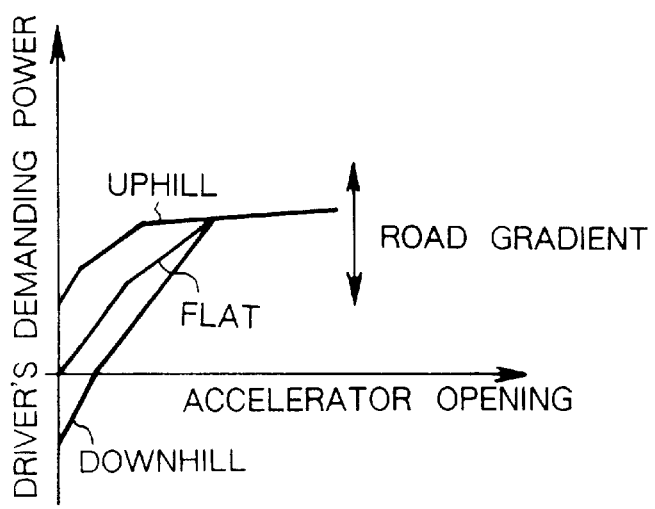
FIG. 8 is a diagram illustrating one example of a map for correcting the driver's demanding power on the basis of a road gradient.

On the other hand, data such as the load of the road gradient or the accessories or the driver type (or drive type) are read in so that the driver's demanding power is corrected (at Step S13) on the basis of the read data. In the presence of the load, specifically, the driver's demanding power is corrected to increase according to the load. This correction is exemplified in FIG. 8 illustrating a correction map based on the road gradient. In this example, the road gradient is classified into such three kinds that the driver's demanding power may be increased the more for the larger road gradient. With this control, the demanding power is augmented at an uphill running time so that the run by only the motor/generator 2 with the engine 1 being stopped can be suppressed to lighten the load on the motor/generator 2 and to prevent the start of the engine 1 at the vehicle's start and the resultant deterioration of the drivability. On a downhill, on the other hand, the braking force by operating the accelerator can be adjusted to improve the drivability and to improve the fuel economy by the regenerative braking operation.

When the compressor is driven for the air conditioning operation, when the headlamp is lighted or when the heater is turned ON for defogging the windshield, additionally much energy is consumed for activating those accessories. Therefore, this much energy is added to the driver's demanding power to augment the output power. When the driver's type is directed to the taste for a power run, the driver's demanding power is corrected to increase.

Moreover, the charge demanding power according to the charged state of the battery 8 is read in and added to the demanding power to calculate the final vehicle's demanding power (at Step S14).

By thus controlling the demanding power, it is possible to properly realize the run matching the intention of the driver and to unify the factors for determining the driving performance into the demanding power. As a result, it is possible to simplify the construction of the control logics and to match the acceleration/deceleration feeling efficiently.

Figure 9:
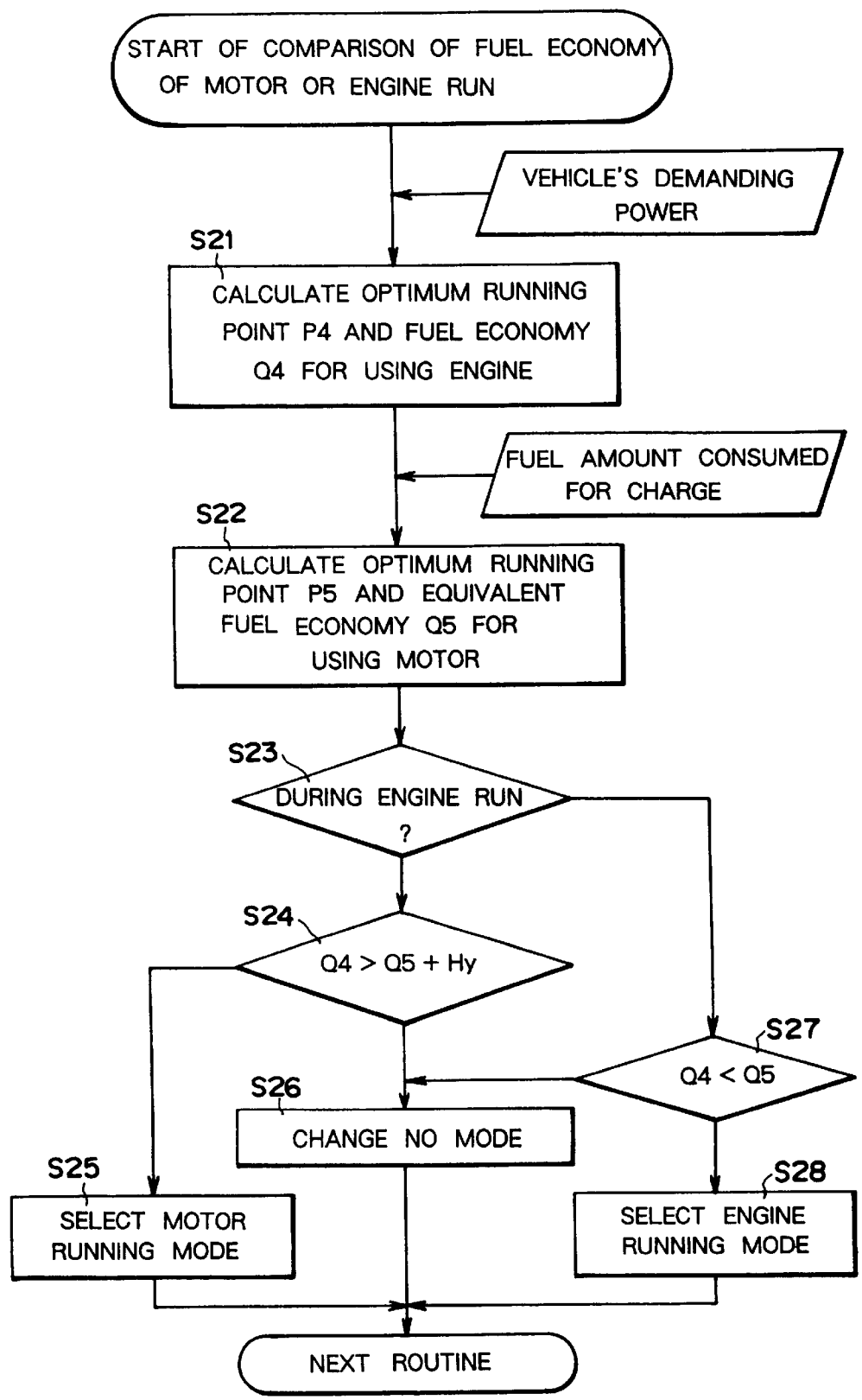
FIG. 9 is a flow chart showing another example of the control routine for selecting the running modes.
Figure 10:
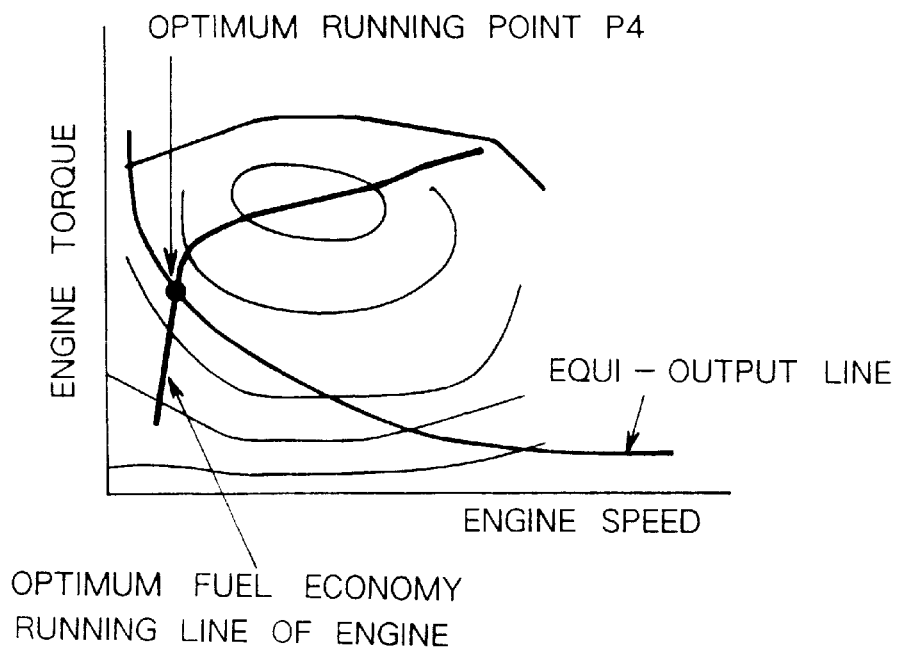
FIG. 10 is a diagram for explaining an optimum fuel economy running point of the engine.

Here, the optimum driving state of the hybrid vehicle in its entirety for the fuel economy is determined by considering the gear ratio, as set by the transmission 15, in addition to the driving state of the engine 1. When the engine run and the motor run are to be selected, therefore, it is desirable to compare the fuel economy at a running point in which the gear ratio is added. This control is exemplified in FIG. 9. In this control, the vehicle's demanding power, as determined by the control shown in FIG. 6, for example, is read in to calculate both an optimum running point P4 (as determined considering the gear ratio set by the transmission 15) when the engine 1 is used to output the demanding power, and a fuel economy Q4 for the point P4. The optimum running point P4 can be determined, for example, as an intersection between the equi-output line corresponding to the vehicle's demanding power and the optimum fuel economy running line, as illustrated in FIG. 10.

Figure 11:
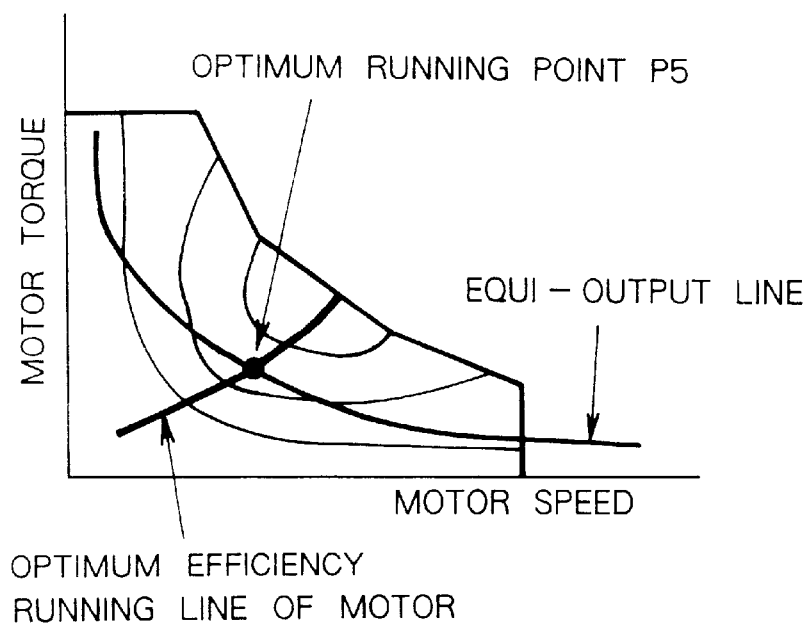
FIG. 11 is a diagram for explaining an optimum efficiency running point of the motor.

Then, the fuel amount used for the charge is read in, and an optimum running point P5 and an equivalent fuel economy Q5 when the vehicle is to be run by the motor/generator 2 using the electric power are calculated (at Step S22). Here, the "equivalent fuel economy" is exemplified by a product of the fuel amount, as required for charging a unit electric power when the motor/generator 2 is driven by the charged electric power, and a discharge factor. The running point P5 can be determined, for example, as an intersection between an equi-output line corresponding to the vehicle's demanding power and an optimum efficiency running line of the motor, as illustrated in FIG. 11.

Next, it is decided (at Step S23) whether or not the engine is running, that is, whether or not it is in the engine running mode. When this engine running mode is set so that the answer of Step S23 is YES, a comparison is made (a Step S24) between the fuel economy Q4 when the engine 1 is used and the sum of the fuel economy Q5 when the motor/generator 2 is used and a predetermined hysteresis Hy for preventing the hunting. When the former fuel economy Q4 at the engine using time is higher, the motor running mode is selected (at Step S25). When the fuel economy Q4 is lower, on the contrary, the engine running mode is kept without changing the running mode (at Step S26).

When the motor running mode is set so that the answer of Step S23 is NO, on the contrary, the fuel economy Q4 at the engine using time and the fuel economy Q5 at the motor/generator using time are compared (at Step S27). When the former fuel economy Q4 is higher than the latter fuel economy Q5, moreover, the routine advances to Step S26, at which the motor running mode is kept without changing the running mode. When the fuel economy Q4 at the engine using time is lower, on the contrary, the engine running mode is selected in place of the motor running mode (at Step S28).

With the control thus far described with reference to FIG. 9, the running mode is selected on the basis of the optimum running point including the gear ratio at the transmission 15 so that the energy efficiency can be improved to improve the fuel economy far better than the prior art.

Figure 12:
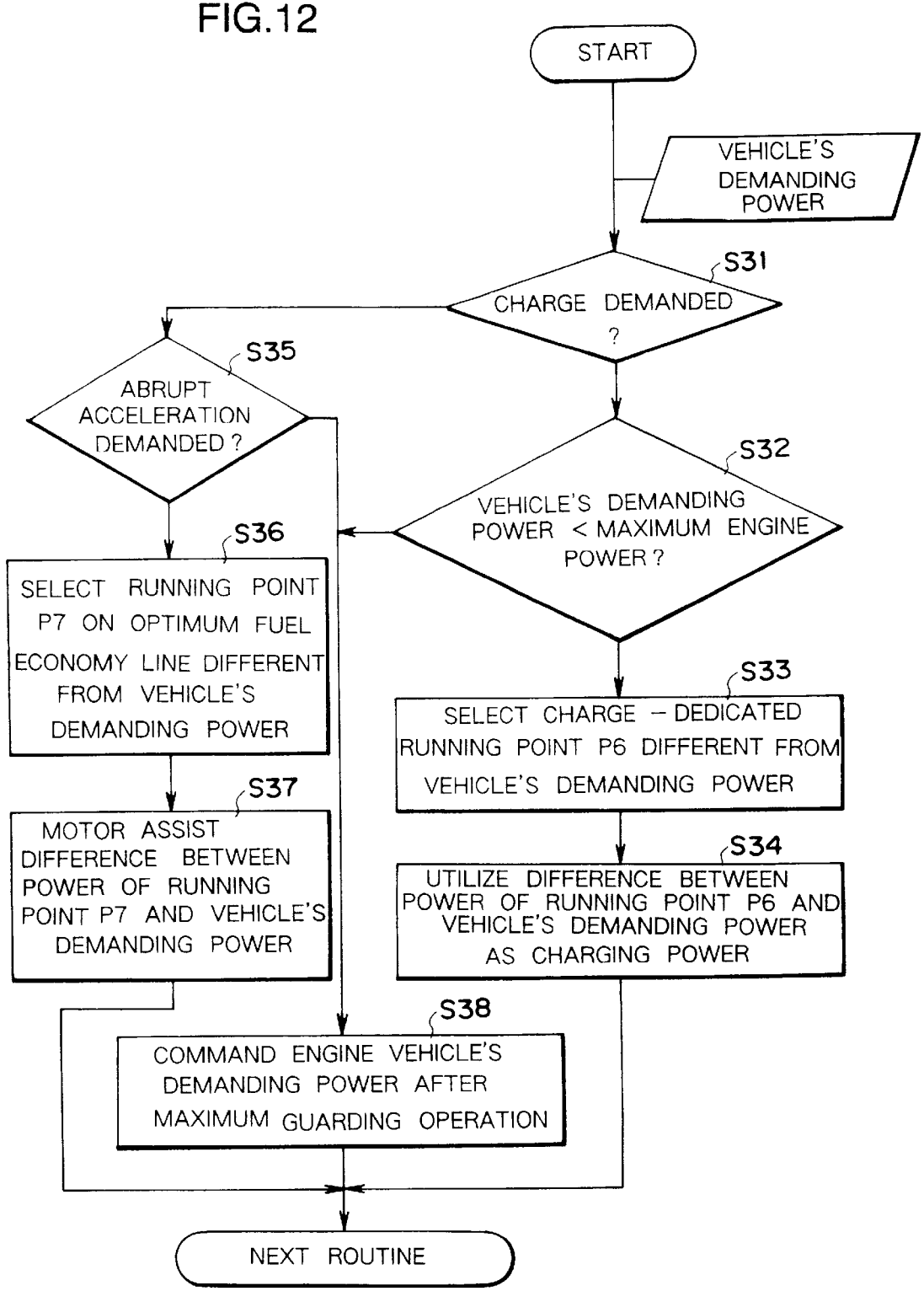
FIG. 12 is a flow chart showing one example of a routine for setting/controlling running points in the cases where a charge is demanded and an abrupt acceleration is demanded.

In the hybrid drive system thus far described, the engine 1 and the motor/generator 2 acting as the prime movers are coupled in parallel so that a variety of driving patterns can be adopted. In specific driving patterns: the vehicle can be run exclusively by the engine 1; the run and the charge can be effected by the output of the engine 1; and this output of the engine 1 can be assisted by the motor/generator 2. The fuel economy and the drivability can be improved by the effective use of those various driving modes. This effective use is exemplified by FIG. 12. In the control example shown in FIG. 12, data such as the vehicle's demanding power are read in, and it is decided (at Step S31) whether or not a charge is demanded. When the charge of the battery 8 is so low that the answer of Step S31 is YES, it is decided (at Step S32) whether or not the vehicle's demanding power is less than the maximum output of the engine.

Figure 13:
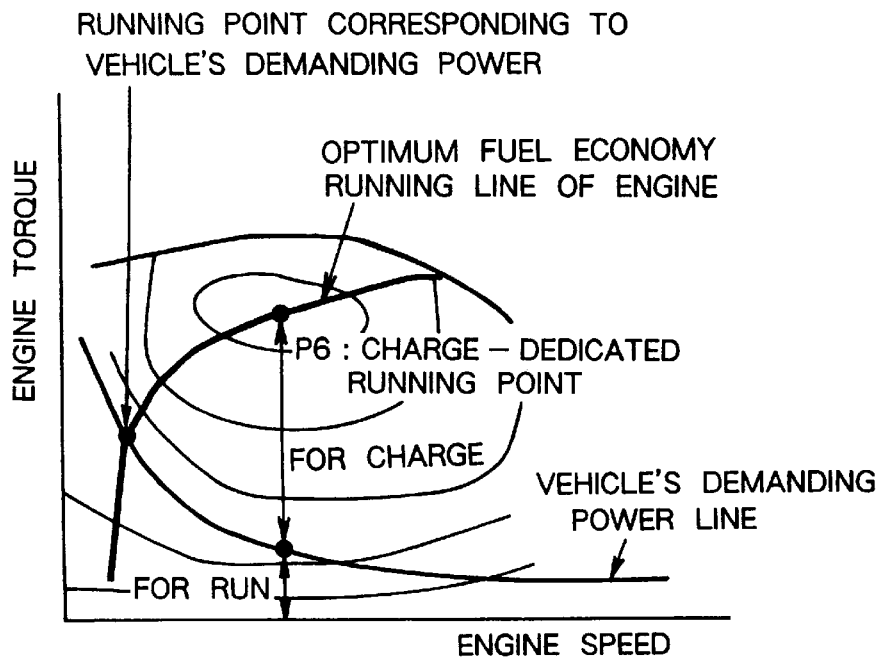
FIG. 13 is a diagram illustrating an engine running point at a charging time.

When the answer of Step S32 is YES, the output of the engine 1 can be augmented more than the vehicle's demanding power. In this case, a charging running point for a higher output than the vehicle's demanding power is selected (at Step S33). This selection is exemplified in FIG. 13, in which the running point for outputting the vehicle's demanding power is indicated as an intersection between an equi-output line (or a vehicle's demanding power line) corresponding to that power and the optimum fuel economy running line. The charging running point to be set at Step S33 on demand for the charge is designated at P6 in FIG. 13. This running point is indicated as an intersection between an equi-output line of a higher output than the vehicle's demanding power line and the optimum fuel economy running line. Moreover, the difference between the output at the running point P6 and the vehicle's demanding power is utilized as the power for the charge (at Step S34). As shown in FIG. 13, more specifically, the torque, as indicated by an intersection between a line leading perpendicular to the abscissa from the running point P6 and the vehicle's demanding power line is consumed for running the vehicle, and the excess torque is consumed for the charge. In this case, the engine torque becomes lower than that without any charge, but the driving torque can be still kept necessary and sufficient by setting a suitable gear ratio.

By this control, it is possible to improve the charge efficiency. When an acceleration is demanded, on the other hand, the driving force can be quickly augmented by interrupting the charge to eliminate the charging load, so that the acceleration responsibility and the drivability can be improved.

Figure 14:
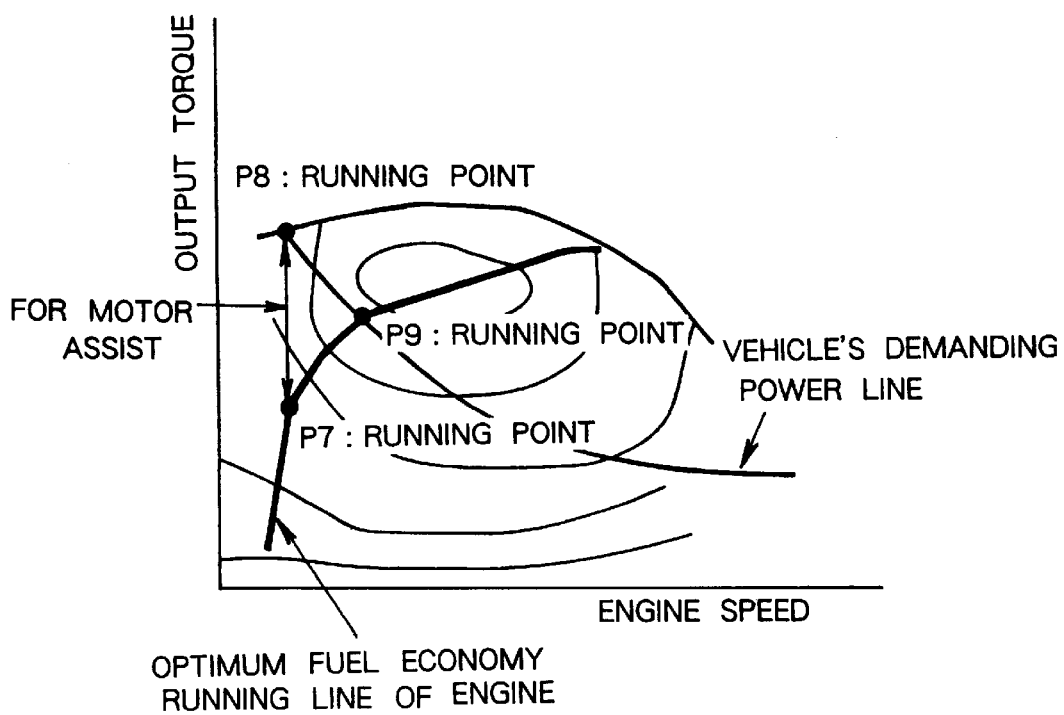
FIG. 14 is a diagram illustrating an engine running point at an abrupt acceleration time.

When no charge is demanded so that the answer of Step S31 is NO, on the contrary, it is decided (at Step S35) whether or not an abrupt acceleration is demanded. This decision can be made in terms of the increase or the changing rate of the accelerator opening, for example. When the abrupt acceleration is demanded so that the answer of Step S35 is YES, the running state of the engine 1 is set (at Step S36) to a running point P7 which is lower in the output than the vehicle's demanding power and which lies on the optimum fuel economy line, as shown in FIG. 14. Since this running state is lower in the torque than a running point P8 at which the vehicle's demanding power is outputted, this shortage is assisted by the motor/generator 2 (at Step S37). After this, the running state of the engine 1 is shifted from the running point P7 to a running point P9, as shown in FIG. 14. This running point P9 is located at the intersection between the vehicle's demanding power line and the optimum fuel economy running line. In this case, therefore, the amount of assist by the motor/generator 2 is reduced according to the shift in the running point. Finally, the vehicle is run at the running point P9 exclusively by the engine 1.

By this control, therefore, the fuel economy is improved because the running state of the engine 1 is so held on the optimum fuel economy running line even for the abrupt acceleration that it does not shift in the direction to deteriorate the fuel economy. Since the torque is retained by the assist of the motor/generator 2, moreover, the acceleration is not deteriorated.

Here, when the answer of Step S32 or S35 is NO, the vehicle's demanding power is employed as it is as the engine output command (at Step S38) after the engine output was subjected to a maximum guarding operation. In this case, the running point of the engine 1 is held on the optimum fuel economy running line, and the gear ratio of the transmission 15 is controlled to keep the necessary driving force.

Here will be briefly described the correspondences between the foregoing specific embodiment and the invention. The functions of Steps S3, S4, S5 and S8, as shown in FIG. 1, correspond to first evaluation means of the invention; the function of Step S6 corresponds to second evaluation means of the invention; and the functions Steps S9, S10 and S11 correspond to motive power selecting means of the invention. Moreover, the means for deciding whether or not the motor run is to be performed in the cross-hatched region of FIG. 5 corresponds to means of the invention for calculating the fuel consumption on the basis of the difference in the running point fuel economy.

Although the invention has been described in connection with its specific embodiment, it should not be limited thereto, but the type of the hybrid drive system to which the invention is applied may be in short a parallel hybrid type. Therefore, the means for coupling the engine and the motor/generator to the drive line should not be limited to the aforementioned torque synthesizing/distributing mechanism. When the fuel economy for charge is to be evaluated in the invention, moreover, it is preferable not only to determine the fuel consumption per unit energy but also to adopt a suitable evaluation standard. In short, it is preferable to adopt an evaluation standard capable of making comparison with the amount of fuel to be consumed for the engine run.

According to the invention, as has been described hereinbefore, the fuel, as consumed for the charged electric power, is evaluated so that the running mode, i.e., the motive power source to be used for running the vehicle is selected by comparing the consumed fuel assuming the runs using the electric power and that assuming the runs using the internal combustion engine. As a result, the fuel consumption for running the vehicle can be reduced more than the prior art to improve the fuel economy of the vehicle while reducing the exhaust gasses.

According to the invention, moreover, the fuel consumption for charging the battery is calculated including the difference between the fuel economies with and without the charge, so that the fuel consumption for the reserved electric power can be grasped more accurately. As a result, the run which has been made in the prior art by the internal combustion engine can be effected by the electric motor so that the running region by the electric motor can be widened to improve the fuel economy better.

What is claimed is:

1. A drive control system for a hybrid vehicle, which can select a run using a motive power generated by burning a fuel in an internal combustion engine and a run using a motive power generated with an electric power by an electric motor and which can generate and reserve the electric power in a battery device, comprising:

first evaluation means for evaluating the fuel consumption in the case assuming that the run with a demanded power is made by using the electric power reserved in said battery device, while including the fuel consumption at the time when said battery device is charged with the electric power;

second evaluation means for evaluating the fuel consumption in the case assuming that said run with the demanded power is made by said motive power generated by burning the fuel in the internal combustion engine; and motive power selecting means for selecting one of said run using the electric motor and said run using the internal combustion engine, on the basis of the evaluation results of said first evaluation means and said second evaluation means.

2. A drive control system for a hybrid vehicle according to claim 1, wherein said first evaluation means includes means for determining a fuel amount per unit energy, from the fuel consumed for the charge and the energy amount charged in said battery device;

wherein said second evaluation means includes means for determining a fuel amount per unit energy outputted by said internal combustion engine; and wherein said motive power selecting means includes means for comparing the fuel amount per unit energy, as determined by said first evaluation means, and the fuel amount per unit energy, as determined by said second evaluation means.

3. A drive control system for a hybrid vehicle according to claim 1, wherein said first evaluation means includes means for determining a fuel amount per unit of the energy, with which said battery device is charged, on the basis of a plurality of data including the fuel consumption in a running state of the internal combustion engine when the run and the power generation are performed by said internal combustion engine.

4. A drive control system for a hybrid vehicle according to claim 1, further comprising:

means for determining said demanded power on the basis of at least one of a driver's demanding power, as calculated on the basis of data including a vehicle speed and a throttle opening, a load on the vehicle, and a load for charging the battery.

5. A drive control system for a hybrid vehicle according to claim 1, further comprising:

means for calculating the fuel consumption at the time when said battery device is charged with said electric power, on the basis of a difference between the fuel consumption of a running point of said internal combustion engine when said charging operation is performed, and the fuel consumption at a running point of said internal combustion engine when it is assumed that said charging operation is not performed.

6. A drive control system for a hybrid vehicle according to claim 5, further comprising:

a transmission for changing the speeds of the motive power inputted from said internal combustion engine and the motive power inputted from said electric motor and for outputting the speeds; and means for determining the fuel consumption at the individual running points on the basis of a plurality of data including the gear ratio set by said transmission.

* * * * *